United States Patent
Ju et al.

(10) Patent No.: US 10,528,235 B2
(45) Date of Patent: Jan. 7, 2020

(54) MOBILE DEVICE AND CONTROLLING METHOD FOR ADJUSTING THE SIZE OF AN IMAGE PREVIEW SCREEN

(71) Applicant: LG Electronics Inc., Seoul (KR)

(72) Inventors: Wanho Ju, Seoul (KR); Youngjun Lee, Seoul (KR); Seonhwi Cho, Seoul (KR); Donghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 270 days.

(21) Appl. No.: 15/172,479

(22) Filed: Jun. 3, 2016

(65) Prior Publication Data

US 2017/0160906 A1 Jun. 8, 2017

(30) Foreign Application Priority Data

Dec. 2, 2015 (KR) .................. 10-2015-0170932

(51) Int. Cl.
*G06F 3/0484* (2013.01)
*G06F 3/0488* (2013.01)
*H04N 5/232* (2006.01)
*G06F 3/0482* (2013.01)

(52) U.S. Cl.
CPC ........ *G06F 3/04842* (2013.01); *G06F 3/0482* (2013.01); *G06F 3/0488* (2013.01); *G06F 3/04845* (2013.01); *H04N 5/23216* (2013.01); *G06F 2203/04808* (2013.01)

(58) Field of Classification Search
None
See application file for complete search history.

(56) References Cited

U.S. PATENT DOCUMENTS

| 8,854,299 | B2* | 10/2014 | Bender | G06F 1/1694 345/156 |
| 8,902,325 | B2* | 12/2014 | Weatherford | H04N 5/341 348/222.1 |
| 9,436,379 | B2* | 9/2016 | Gan | G06F 3/0414 |
| 2007/0003266 | A1* | 1/2007 | Schmitt | G03B 17/02 396/56 |
| 2007/0004451 | A1* | 1/2007 | Anderson | G06F 1/1626 455/556.1 |
| 2007/0252821 | A1* | 11/2007 | Hollemans | G06F 3/0416 345/173 |

(Continued)

FOREIGN PATENT DOCUMENTS

EP 2000894 A2 12/2008
EP 2169946 A2 3/2010

(Continued)

*Primary Examiner* — Christopher J Fibbi
(74) *Attorney, Agent, or Firm* — Dentons US LLP

(57) ABSTRACT

A mobile device and controlling method thereof are disclosed, by which user's convenience is enhanced. The present invention includes the steps of if receiving a specific input from a user, displaying a screen capable of selecting either a gallery application and a camera application, if receiving a selection input from the user, running a specific application corresponding to the selection input, displaying a preview screen of the specific application, and if receiving a specific touch input from the user, adjusting at least one of a size and position of the preview screen.

12 Claims, 16 Drawing Sheets

(56) References Cited

U.S. PATENT DOCUMENTS

| | | | | |
|---|---|---|---|---|
| 2008/0165144 | A1* | 7/2008 | Forstall | G06F 1/1626 |
| | | | | 345/173 |
| 2014/0063313 | A1 | 3/2014 | Choi et al. | |
| 2014/0250406 | A1* | 9/2014 | Seo | G06F 3/0488 |
| | | | | 715/781 |
| 2014/0300569 | A1* | 10/2014 | Matsuki | G06F 3/041 |
| | | | | 345/173 |
| 2015/0189178 | A1* | 7/2015 | Lombardi | H04N 5/2258 |
| | | | | 348/207.99 |
| 2016/0041750 | A1* | 2/2016 | Cieplinski | G06F 3/0488 |
| | | | | 715/716 |
| 2016/0100100 | A1* | 4/2016 | Ryu | H04M 5/23222 |
| | | | | 715/800 |

FOREIGN PATENT DOCUMENTS

| | | |
|---|---|---|
| EP | 2290927 A2 | 3/2011 |
| EP | 2563016 A1 | 2/2013 |

* cited by examiner

MOBILE DEVICE AND CONTROLLING METHOD FOR ADJUSTING THE SIZE OF AN IMAGE PREVIEW SCREEN

Pursuant to 35 U.S.C. § 119(a), this application claims the benefit of earlier filing date and right of priority to Korean Application No. 10-2015-0170932, filed on Dec. 2, 2015, the contents of which are hereby incorporated by reference herein in their entirety.

BACKGROUND OF THE INVENTION

Field of the Invention

The present invention relates to a mobile device, and more particularly, to a mobile device and controlling method thereof. Although the present invention is suitable for a wide scope of applications, it is particularly suitable for activating a camera and then adjusting a size and position of a preview screen by user's simple manipulation if receiving a specific gesture input from a user in the course of executing an application available for image insertion.

Discussion of the Related Art

Recently, owing to the developments of the IT technologies, a wearable device becomes a big issue in daily life. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be embodied into a multimedia player provided with complex functions such as photographing of photos or videos, playback of music or video files, game play, broadcast reception and the like for example. Particularly, a function of taking a photo using a camera in a mobile device is one of the primary functions.

In a related art technology, while a specific application is run, several steps of launching a camera application to photograph an object located in front of a user, taking an image of the object, searching a memory for the taken image, launching a specific application, and inserting the found image are necessary to attach a photo. Thus, in case of attaching a photo, since it takes a considerable time and requires many steps of use, there is a problem of causing inconvenience to a user.

SUMMARY OF THE INVENTION

Accordingly, embodiments of the present invention are directed to a mobile device and controlling method thereof that substantially obviate one or more problems due to limitations and disadvantages of the related art.

One object of the present invention is to provide a mobile device and controlling method thereof, by which a camera application can be launched using a simple gesture in the course of running a specific application, by which a size of a preview screen can be adjusted using user's simple action, and by which a photo can be inserted in an appropriate location.

Another object of the present invention is to provide a mobile device and controlling method thereof, by which a preview screen is displayed with reference to points touched with two fingers in case of long touching a screen with the two fingers in a state that the mobile device is stood up and by which a camera is activated.

Further object of the present invention is to provide a mobile device and controlling method thereof, by which a preview screen region is initially set through a long touch input and by which a size and width-to-length ratio of the preview screen can be adjusted using user's simple touch input only.

Another further object of the present invention is to provide a mobile device and controlling method thereof, by which a preview screen is displayed in case of receiving an input of touching a screen prescribed times and a drag touch input from a user and by which a size of the preview screen can be adjusted through user's simple touch input only.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile device in running an application capable of inserting an image according to one embodiment of the present invention may include an input unit configured to receive a specific input from a user, a camera configured to photograph a view in front of the mobile device, a controller, if receiving the specific input from the user, displaying a screen capable of selecting either a gallery application and a camera application associated with the camera, the controller, if receiving a selection input from the user, running a specific application corresponding to the selection input, the controller displaying a preview screen of the specific application, the controller, if receiving a specific touch input from the user, adjusting at least one of a size and position of the preview screen, and a display unit configured to display at least one of the selection screen and the preview screen in response to a control command from the controller.

In another aspect of the present invention, as embodied and broadly described herein, a method of controlling a mobile device in running an application capable of inserting an image according to another embodiment of the present invention may include the steps of if receiving a specific input from a user, displaying a screen capable of selecting either a gallery application and a camera application, if receiving a selection input from the user, running a specific application corresponding to the selection input, displaying a preview screen of the specific application, and if receiving a specific touch input from the user, adjusting at least one of a size and position of the preview screen.

Accordingly, embodiments of the present invention provide various effects and/or features.

According to one embodiment of the present invention, a camera application can be launched using a simple gesture in the course of running a specific application, a size of a preview screen can be adjusted using user's simple action, and a photo can be inserted in an appropriate location, whereby user's convenience can be enhanced.

According to another embodiment of the present invention, a preview screen is displayed with reference to points touched with two fingers in case of long touching a screen with the two fingers in a state that the mobile device is stood up and a camera is activated, whereby user's convenience can be enhanced.

According to further embodiment of the present invention, a preview screen region is initially set through a long touch input and a size and width-to-length ratio of the preview screen can be adjusted using user's simple touch input only, whereby user's convenience can be enhanced.

According to another further embodiment of the present invention, a preview screen is displayed in case of receiving an input of touching a screen prescribed times and a drag touch input from a user and a size of the preview screen can be adjusted through user's simple touch input only, whereby user's convenience can be enhanced.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
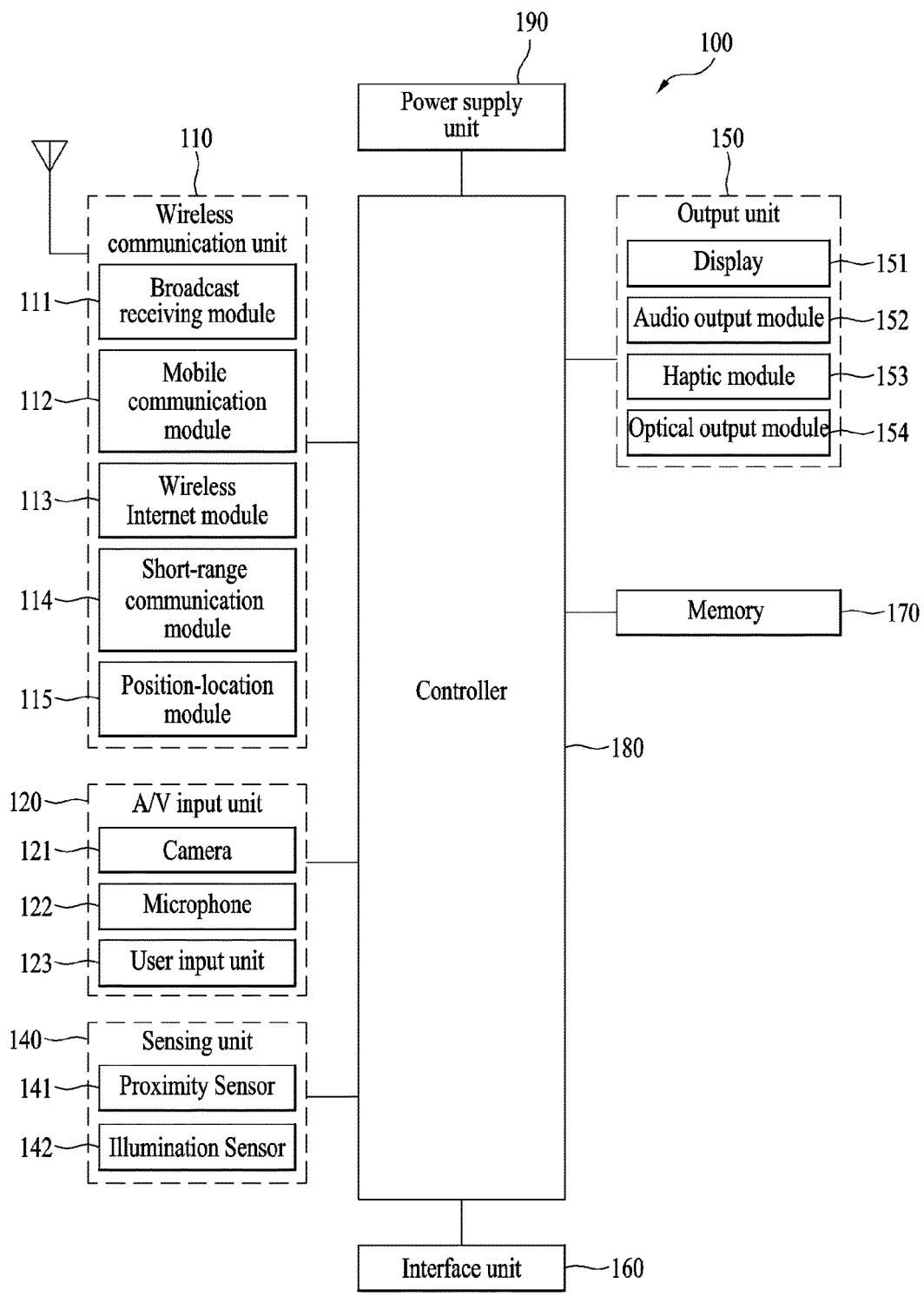
FIG. 1A is a block diagram to describe a mobile terminal device related to the present invention.
Figure 1B:
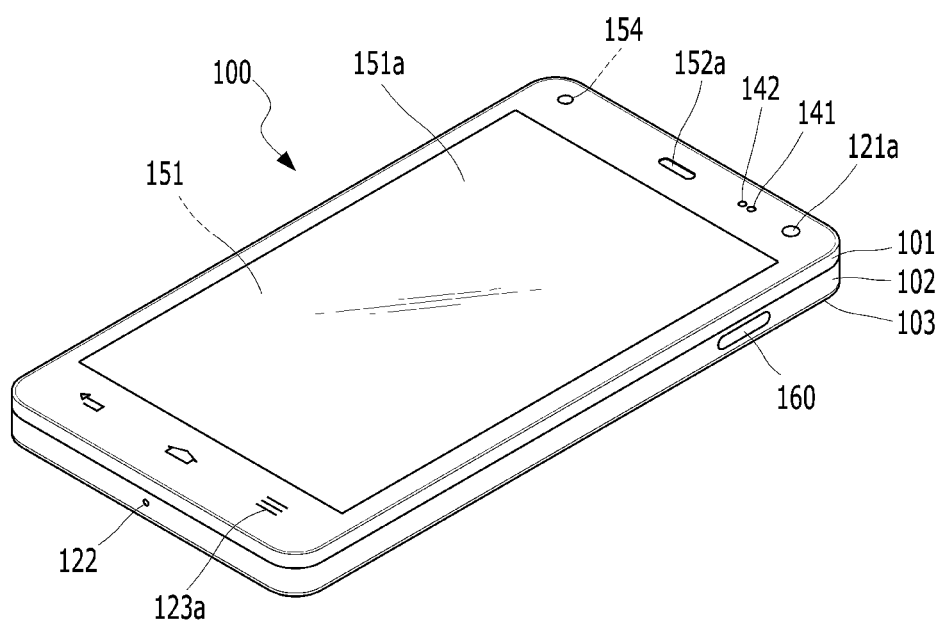
FIG. 1B and FIG. 1C are diagrams for the concept of one example of a mobile terminal related to the present invention in different views, respectively.
Figure 1C:
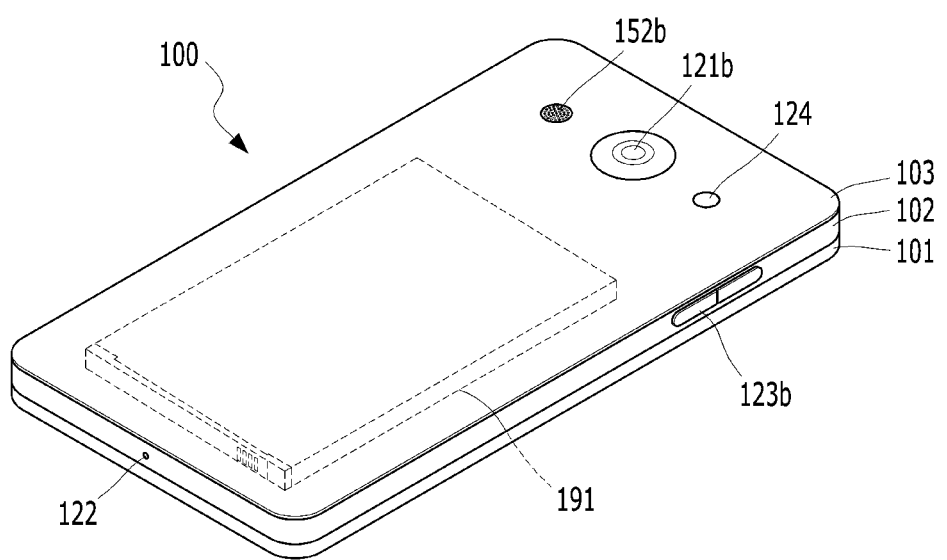

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body.

Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

A web search engine indicates a software system designed to search for information of WWW (World Wide Web). Before a market of a mobile terminal is expanded, users have used a service of the web search engine using a PC (personal computer).

Recently, as the use of a mobile terminal is rapidly increasing in a manner of disseminating a huge amount of smartphones, percentage of the use of a web search engine using the mobile terminal is also increasing.

In case of using the service via a mobile terminal, it is able to not only access a web page of the web search engine using a web browser application but also access the web search engine via an application provided by the web search engine itself.

Meanwhile, services or contents provided on a web page have changed as well. Images or texts used to be provided on a legacy web page as main contents. Yet, not only the images or the texts but also such metadata as location information, tag information and the like are provided on a recent web page.

Location information corresponds to a geographical location. Similar to what is used in a GPS, the location information consists of longitude and latitude. Not only the longitude and the latitude, location information (address and the like) of an administrative district may correspond to the location information as well.

For instance, in case of a web page displaying information on a specific restaurant, the web page can include a picture of the specific restaurant, a picture (image content) of food of the restaurant and explanation (text contents) on the pictures. Additionally, location of the restaurant can be included in the location information content.

As mentioned in the foregoing description, while the recent web page provides various contents, a search result provided by the web search engine does not include information on the contents, thereby causing inconvenience. Hence, one embodiment of the present invention described in the following proposes to provide the information on the various contents on a service provided by the web search engine. In the following, a specific embodiment is explained with reference to drawings.

Meanwhile, according to the present invention, information processed in a mobile terminal can be displayed using a flexible display. Regarding this, it is explained in more detail in the following with reference to the attached drawings.

Figure 2:
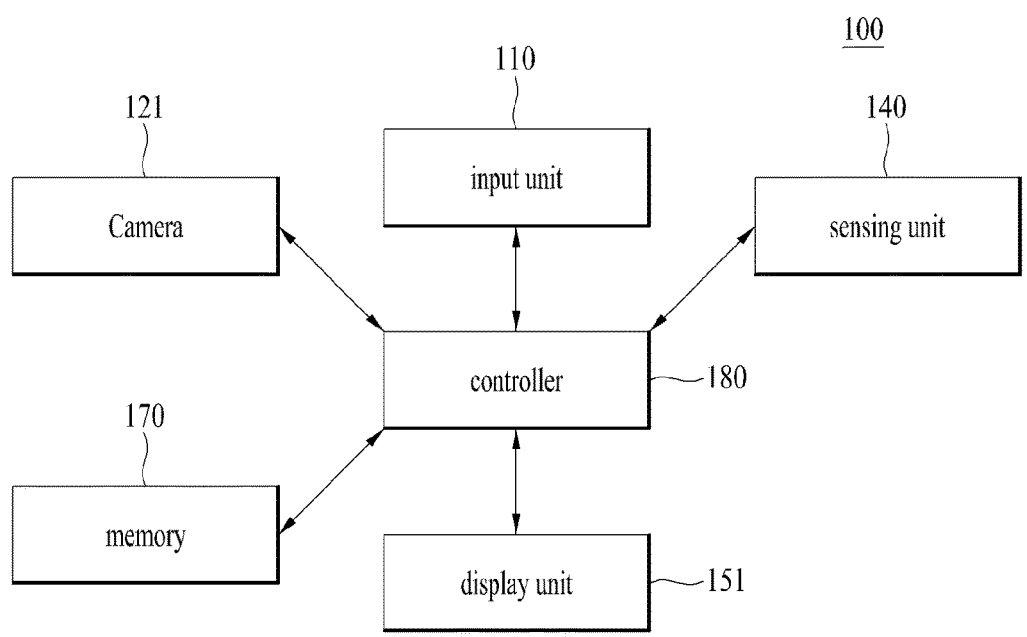
FIG. 2 is a block diagram of a mobile device according to one embodiment of the present invention.

FIG. 2 is a block diagram of a mobile device according to one embodiment of the present invention.

Referring to FIG. 2, a mobile device 100 according to one embodiment of the present invention includes an input unit 110, a camera 121, a sensing unit 140, a display unit 151, a memory 170, and a controller 180.

The input unit 110 receives a specific input from a user.

The camera 121 takes a picture in front of the mobile device.

The sensing unit 140 senses an angle between a straight line faced by a camera lens of the mobile device 100 and a straight line vertical to a ground.

The display unit 151 displays at least one of a screen for selecting one of a plurality of applications and a preview screen in response to a control command from the controller 180.

The memory 170 saves photos and images taken through the camera 121.

If a specific input is received from a user, the controller 180 displays a screen for selecting one of a gallery application and a camera application associated with a camera. If a selection input is received from the user, the controller 180 executes a specific application corresponding to the selection input and displays a preview screen of the specific application. If a specific touch input is received form the user, the controller 180 adjusts at least one of a size and position of the preview screen.

In this instance, the preview screen means a screen inputted through the camera 121 before taking a photo. The user can set a photographing composition and a focus target while watching at the preview screen. And, the preview screen may mean a screen, on which a specific image among a plurality of images is displayed, in case of running the gallery application.

Figure 3:
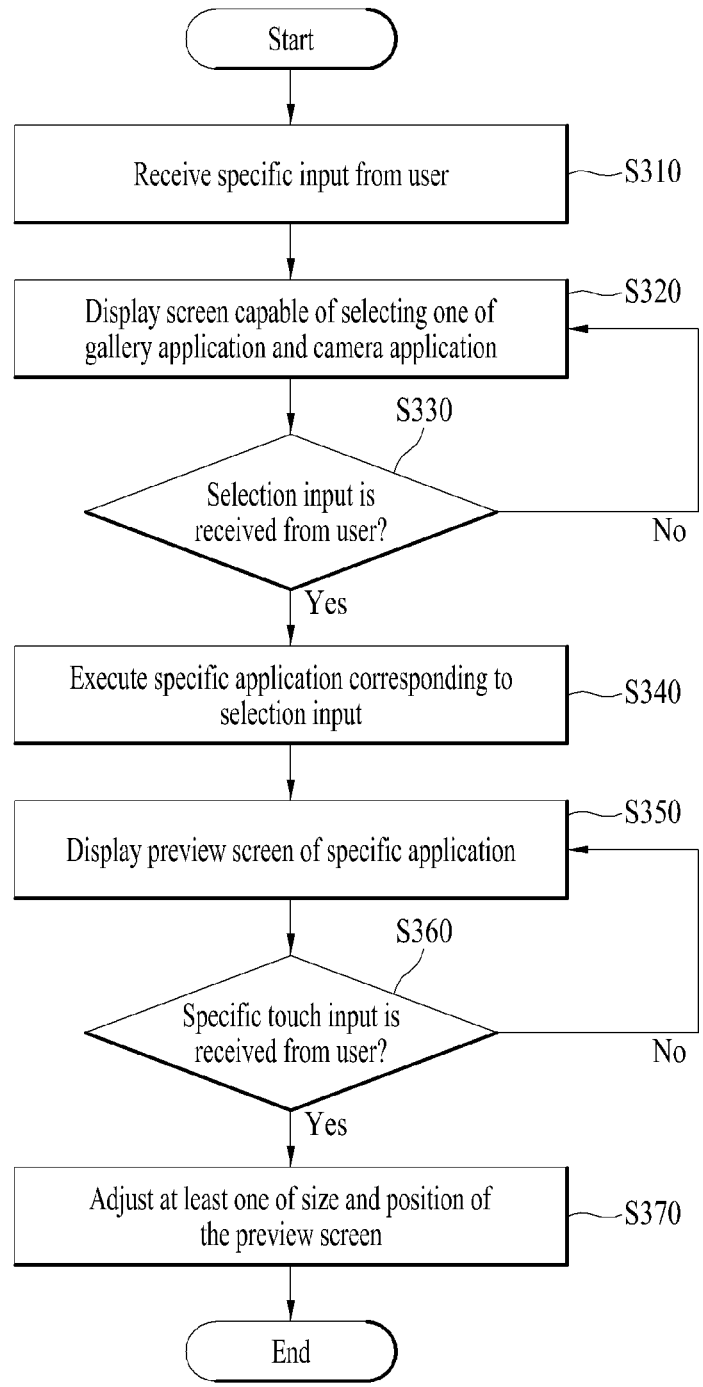
FIG. 3 is a flowchart for an operation of a mobile terminal according to one embodiment of the present invention.

FIG. 3 is a flowchart for an operation of a mobile terminal according to one embodiment of the present invention. In particular, the present invention is implemented by the controller 180.

Referring to FIG. 3, a specific input is received from a user [S310].

A screen for selecting one of a gallery application and a camera application is displayed [S320].

If a selection input for selecting one of the gallery application and the camera application is received from the user [S330], a specific application corresponding to the selection input is executed [S340].

If the selection input is not received from the user [S330], the routine goes back to the step S320.

A preview screen of a specific application is displayed [S350].

If a specific touch input is received from the user [S360], at least one of a size and position of the preview screen is adjusted [S370].

If the specific touch input is not received from the user [S360], the routine goes back to the step S350.

Figure 4:
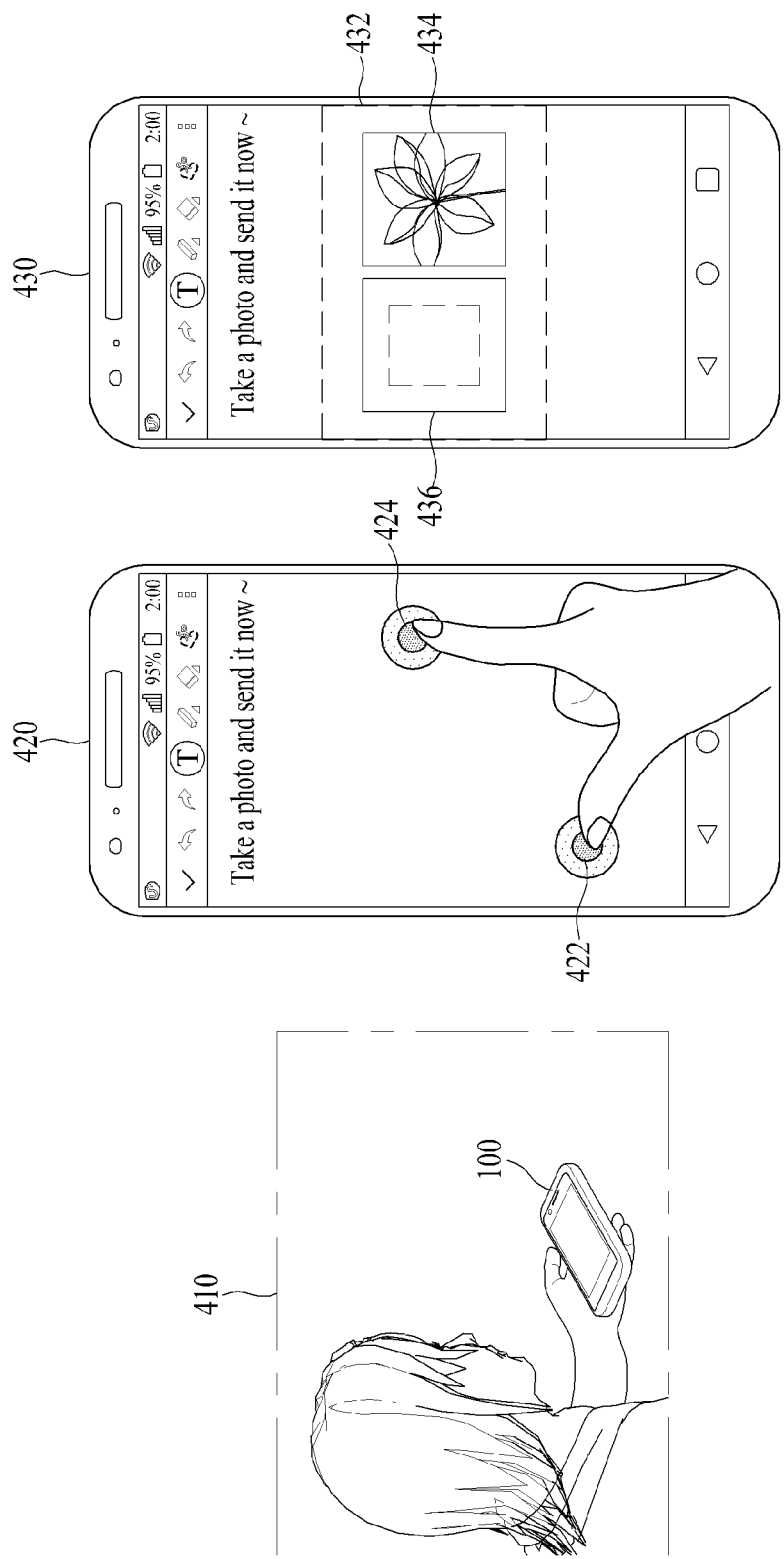
FIG. 4 is a diagram to describe one example of displaying a menu screen including a camera application and a gallery application in case of receiving an input of long touching a screen with two fingers from a user according to one embodiment of the present invention.

FIG. 4 is a diagram to describe one example of displaying a menu screen including a camera application and a gallery application in case of receiving an input of long touching a screen with two fingers from a user according to one embodiment of the present invention.

Referring to an embodiment 410, a user inputs a touch input to a screen while a mobile device 100 is laid. According to another embodiment of the present invention, the user may input a touch input to the screen while the mobile device 100 is stood up.

Referring to an embodiment 420, a specific input is received from the user. For instance, a touch input of pressing $1^{st}$ and $2^{nd}$ points 422 and 424 of the screen with two fingers of the user over a prescribed time is received from the user.

Referring to an embodiment 430, in response to the received specific input, the controller 180 displays a screen capable of selecting one of a gallery application 434 and a camera application 436 associated with the camera 121.

If a selection input is received from the user, the controller executes a specific application corresponding to the selection input and displays a preview screen of the specific application. If a specific touch input is received from the user, the controller 180 adjusts at least one of a size and position of the preview screen.

Figure 5:
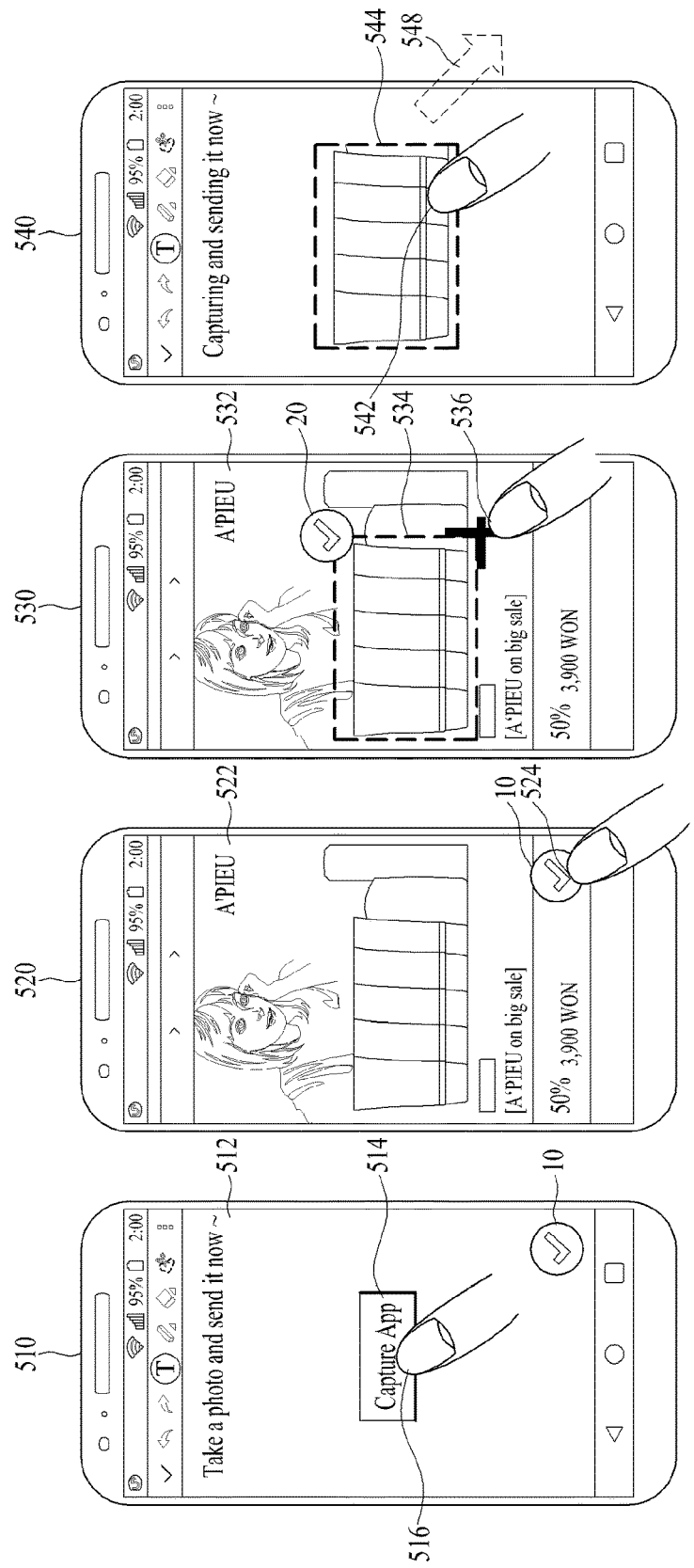
FIG. 5 is a diagram to describe a case of running a capture application according to one embodiment of the present invention.

FIG. 5 is a diagram to describe a case of running a capture application according to one embodiment of the present invention.

Referring to FIG. 5, the controller 180 displays a screen for selecting an application to capture a screen image. If an input for selecting the application is received from a user, the controller 180 creates a $1^{st}$ capture button. Thereafter, if an input for selecting the $1^{st}$ capture button from a specific screen is received from the user, the controller 180 creates a specific screen image by capturing a current screen and displays a preview screen of the created screen image. If a specific input is received from the user, the controller 180 adjusts at least one of a size and position of the preview screen.

Referring to an embodiment 510, while an application capable of inserting an image is run, the controller 180 displays a screen 512 for selecting an application for capturing a screen image. If an input 516 for selecting the capture application 514 is received from a user, the controller 180 creates a $1^{st}$ capture button 10.

Referring to an embodiment 520, if an input 524 for selecting the $1^{st}$ capture button 10 is received from the user, the controller 180 creates a specific screen image 522 by capturing a current screen.

Specifically, if an input for selecting a home button is received from a user, the controller 180 can display a specific screen. After a submenu desired by the user has been entered by running an application, if a selection input is received from the user, the controller 180 can display a specific screen.

Referring to an embodiment 530, the controller 180 displays a preview screen 534 of the created screen image 532. If a specific touch input 536 is received from the user, the controller 180 adjusts at least one of a size and position of the preview screen 534.

If an input for selecting a second capture button 20 is received from the user, the controller 180 creates a specific image 534 by capturing a screen included in the preview screen 634.

Referring to an embodiment 540, after a state of running an application capable of inserting the image shown in the embodiment 510 has been entered, the controller 180 inserts the created specific image 544 into a designated location. If a touch input 542 applied in a manner of touching an outline part of the specific image 544 and then applying a drag in a specific direction 548 by maintaining the touch input is received from the user, the controller 180 can adjust a size of the specific image 544.

On the other hand, if a touch input 542 applied in a manner of touching a region of the specific image 544 except the outline part of the specific image 544 and then applying a drag in a specific direction 548 by maintaining the touch input is received from the user, the controller 180 can adjust a position of the specific image 544.

In this instance, the application capable of inserting the image may include one of a memo pad application, an email application, a word processor application and the like.

Figure 6:
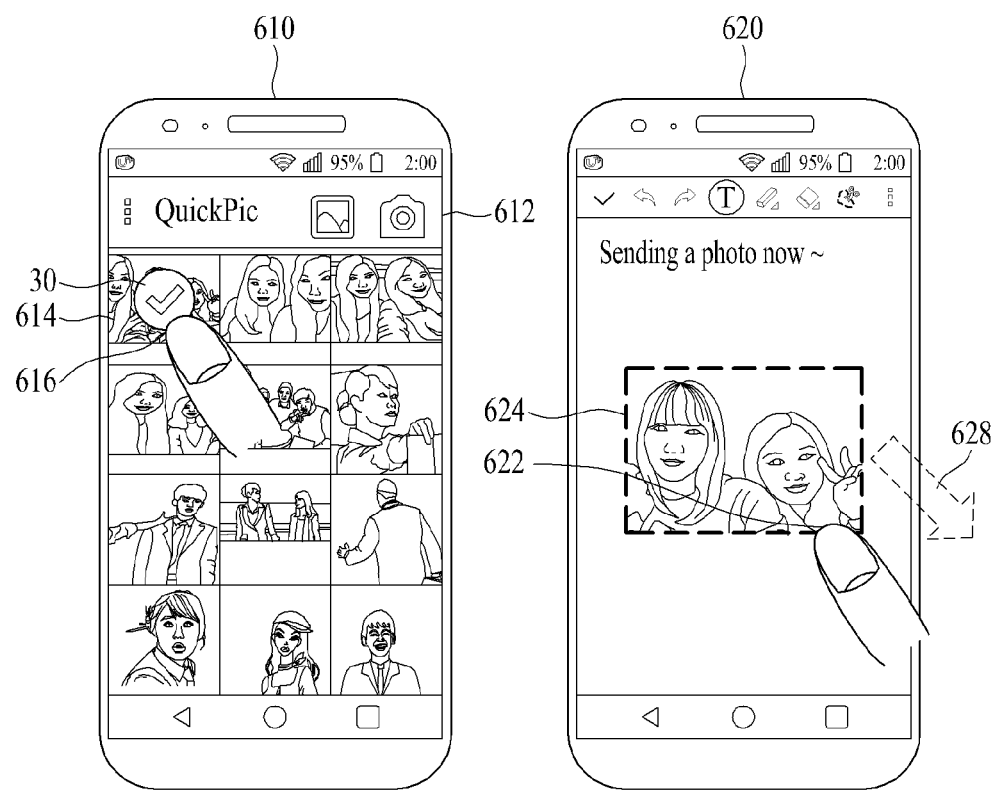
FIG. 6 is a diagram to describe a case of running a gallery application according to one embodiment of the present invention.

FIG. 6 is a diagram to describe a case of running a gallery application according to one embodiment of the present invention.

Referring to an embodiment 610, while a gallery application is run, the controller 180 displays a screen 612 including a plurality of images saved in the memory 170. If an input 616 for selecting a specific image 614 from a plurality of the images is received form a user, the controller 180 creates an indicator 30 indicating that the specific image 614 has been selected.

Referring to an embodiment 620, after a state of running an application capable of inserting the image in the embodiment 610 has been entered, the controller 180 inserts the selected specific image 624 into a designated location. If a touch input 622 applied in a manner of touching an outline part of the specific image 624 and then applying a drag in a specific direction 628 by maintaining the touch input is received from the user, the controller 180 can adjust a size of the specific image 624.

Furthermore, if a touch input 622 applied in a manner of touching a region of the specific image 624 except the outline part of the specific image 624 and then applying a drag in a specific direction 628 by maintaining the touch input is received from the user, the controller 180 can adjust a position of the specific image 624.

Figure 7:
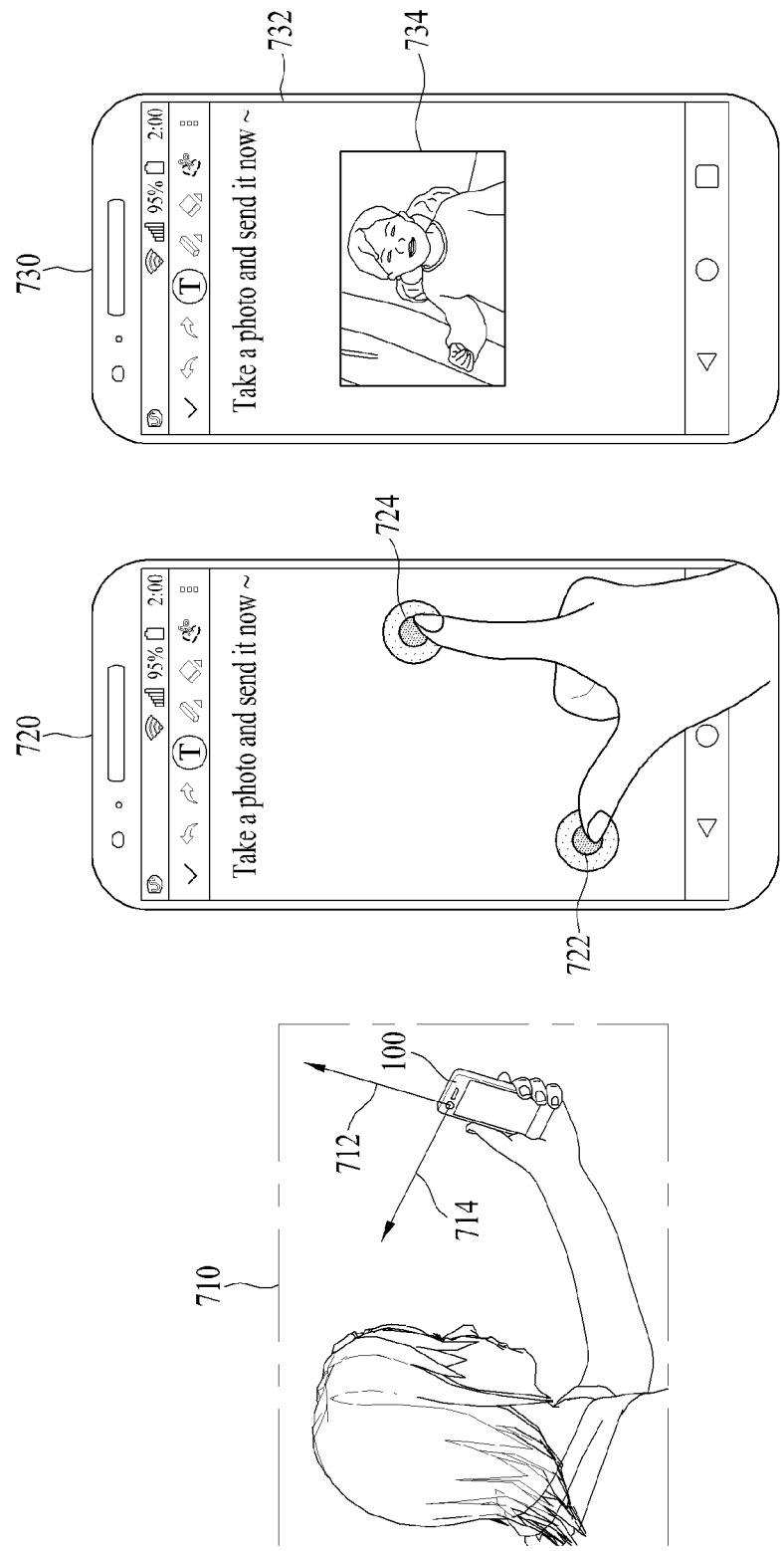
FIG. 7 is a diagram to describe one example of activating a camera in case of receiving an input of long touching a screen with two fingers from a user in a state of standing up a mobile device according to one embodiment of the present invention.

FIG. 7 is a diagram to describe one example of activating a camera in case of receiving an input of long touching a screen with two fingers from a user in a state of standing up a mobile device according to one embodiment of the present invention.

Referring to FIG. 7, when an angle between a straight line faced by a camera lens of the mobile device 100 and a straight line vertical to a ground belongs to a range of a prescribed angle, if a specific touch input is received over a prescribed time from a user, the controller 180 activates the camera 121.

Referring to an embodiment 710, the sensing unit 140 senses an angle between a straight line 714 faced by a camera lens of the mobile device 100 and a straight line 712 vertical to a ground.

If the sensed angle belongs to a range of a prescribed angle, the controller 180 determines a state that the mobile device 100 is stood up. If the state that the mobile device 100 is stood up is entered, the controller 180 can activate the camera 121. If the mobile device 100 is in a state of being laid, the controller 180 can run a screen image capture application and a gallery application.

Referring to an embodiment 720, a specific input is received from a user. For example, the controller 180 receives a touch input of pressing a first point 722 and a second point 724 of a screen with user's two fingers over a prescribed time from the user.

Referring to an embodiment 730, while an application capable of inserting an image is run, the controller 180 activates the camera 121 and displays a preview screen 734 on a current screen 732, in response to the received touch input.

According to the present invention, while an application capable of inserting an image is run, if user's simple touch input is applied, a camera can be activated and a preview screen can be displayed. Hence, since it is unnecessary for the user to run a camera application for photographing separately, user's convenience can be enhanced.

Figure 8:
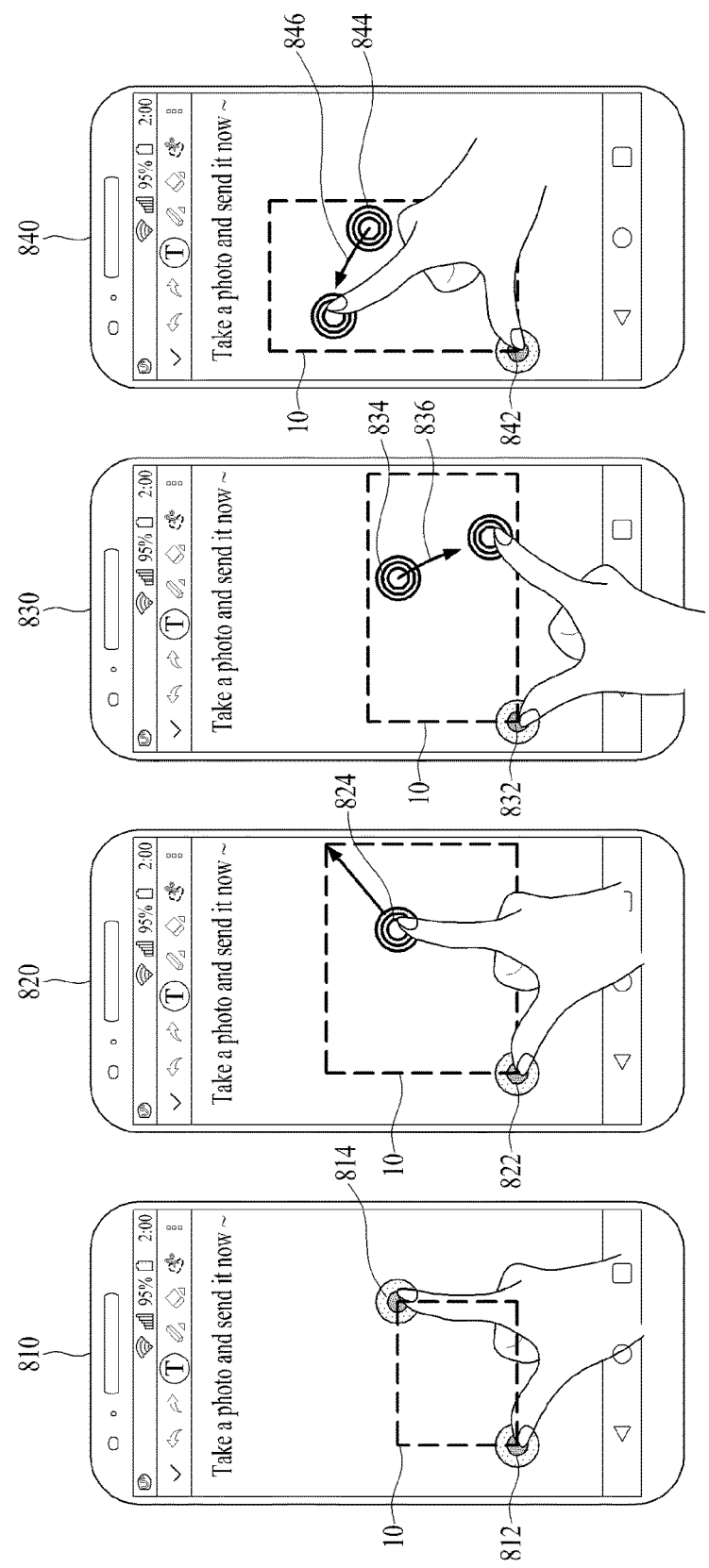
FIG. 8 is a diagram to describe one example of adjusting a size and ratio of a preview screen according to one embodiment of the present invention.

FIG. 8 is a diagram to describe one example of adjusting a size and ratio of a preview screen according to one embodiment of the present invention.

Referring to an embodiment 810, if a long touch input of touching a first point 812 and a second point 814 of a screen over a prescribed time is received from a user, the controller 180 displays a preview screen 10. By receiving a specific touch input from the user, the controller 180 sets a region of the preview screen 10.

Referring to an embodiment 820, after the preview screen 10 has been displayed, while a first touch input 822 is received from the user, if a second touch input 824 having a pressure size equal to or greater than a reference value is received from the user, the controller 180 displays the preview screen 10 in a manner of enlarging the preview screen 10 at the same rate gradually.

For example, while the user touches the screen with a thumb 822, if the user touches the screen with an index finger 824 heavily, the preview screen 10 is gradually enlarged at the same rate.

Referring to the embodiment 820, after the preview screen 10 has been displayed, while a second touch input 824 is received from the user, if a first touch input 822 having a pressure size equal to or greater than a reference value is received from the user, the controller 180 displays the preview screen 10 in a manner of reducing the preview screen 10 at the same rate gradually.

For example, while the user touches the screen with an index finger 824, if the user touches the screen with a thumb 822 heavily, the preview screen 10 is gradually reduced the same rate.

Referring to an embodiment 830, after the preview screen 10 has been displayed, while a first touch input 832 is received from the user, if a second touch input 824 of applying a drag in a first direction 836 and then rotating is received from the user, the controller 180 displays the preview screen 10 in a manner of changing a width ratio of the preview screen 10.

For example, if the first direction 836 is clockwise, the controller 180 enlarges a width ratio of the preview screen 10. In particular, the controller 180 enlarges the width ratio of the preview screen 10 in proportion to a count of receptions of the second touch input 834.

Referring to an embodiment 840, after the preview screen 10 has been displayed, while a first touch input 842 is received from the user, if a second touch input 844 of applying a drag in a second direction 846 and then rotating is received from the user, the controller 180 displays the preview screen 10 in a manner of changing a height ratio of the preview screen 10.

For example, if the second direction 846 is counterclockwise, the controller 180 enlarges a height ratio of the preview screen 10. In particular, the controller 180 enlarges the height ratio of the preview screen 10 in proportion to a count of receptions of the second touch input 844.

According to the present invention, while a thumb is fixed, if an index finger is rotated clockwise, a width ratio of the preview screen 10 can be enlarged.

On the other hand, while a thumb is fixed, if an index finger is rotated counterclockwise, a height ratio of the preview screen 10 can be enlarged.

Figure 9:
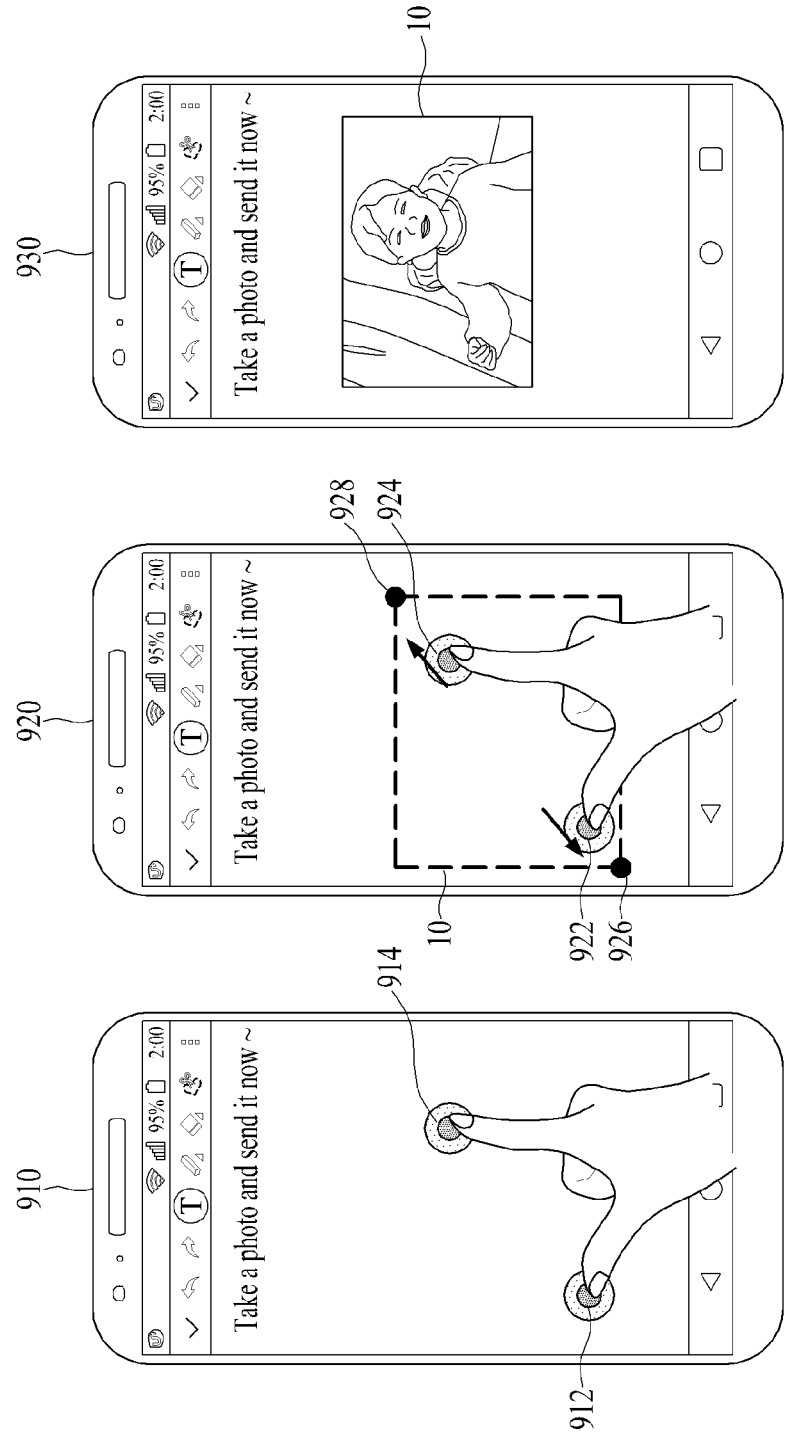
FIG. 9 is a diagram to describe one example of if a user long touches a screen with two fingers, displaying a preview screen and activating a camera according to one embodiment of the present invention.

FIG. 9 is a diagram to describe one example of if a user long touches a screen with two fingers, displaying a preview screen and activating a camera according to one embodiment of the present invention.

Referring to FIG. 9, if a $1^{st}$ touch input and a $2^{nd}$ touch input different from the $1^{st}$ touch input are received from a user over a prescribed time, the controller 180 displays a preview screen. While the preview screen is displayed, if the $1^{st}$ touch input is moved to a $1^{st}$ point by maintaining its touch state and the $2^{nd}$ touch input is moved to a $2^{nd}$ point by maintaining its touch state, the controller 180 displays the preview screen based on the $1^{st}$ point and the $2^{nd}$ point.

Referring to an embodiment 910, if a $1^{st}$ touch input 912 and a $2^{nd}$ touch input 914 different from the $1^{st}$ touch input 912 are received from a user over a prescribed time, the controller 180 displays a preview screen 10 like an embodiment 920.

Referring to an embodiment 920, while the preview screen 10 is displayed, if the $1^{st}$ touch input 922 is moved to a $1^{st}$ point 926 by maintaining its touch state and the $2^{nd}$ touch input 924 is moved to a $2^{nd}$ point 928 by maintaining its touch state, the controller 180 displays the preview screen 10 based on the $1^4$ point 926 and the $2^{nd}$ point 928. That is, in the preview screen 10, the $1^{st}$ point 926 becomes a left bottom corner and the $2^{nd}$ point 928 becomes a right top corner.

Referring to an embodiment 930, the controller 180 activates the camera 121 while displaying the preview screen 10.

According to the present invention, if a user long touches a screen with two fingers, a preview region 10 is displayed with reference to the touch points of the two fingers. While such a state is maintained, if the two fingers are spread slightly without being detached from the screen, the preview region 10 is enlarged. And, a camera is activated based on the enlarged preview region 10. Hence, since the camera can be activated through a simple touch action, user convenience can be enhanced.

Figure 10:
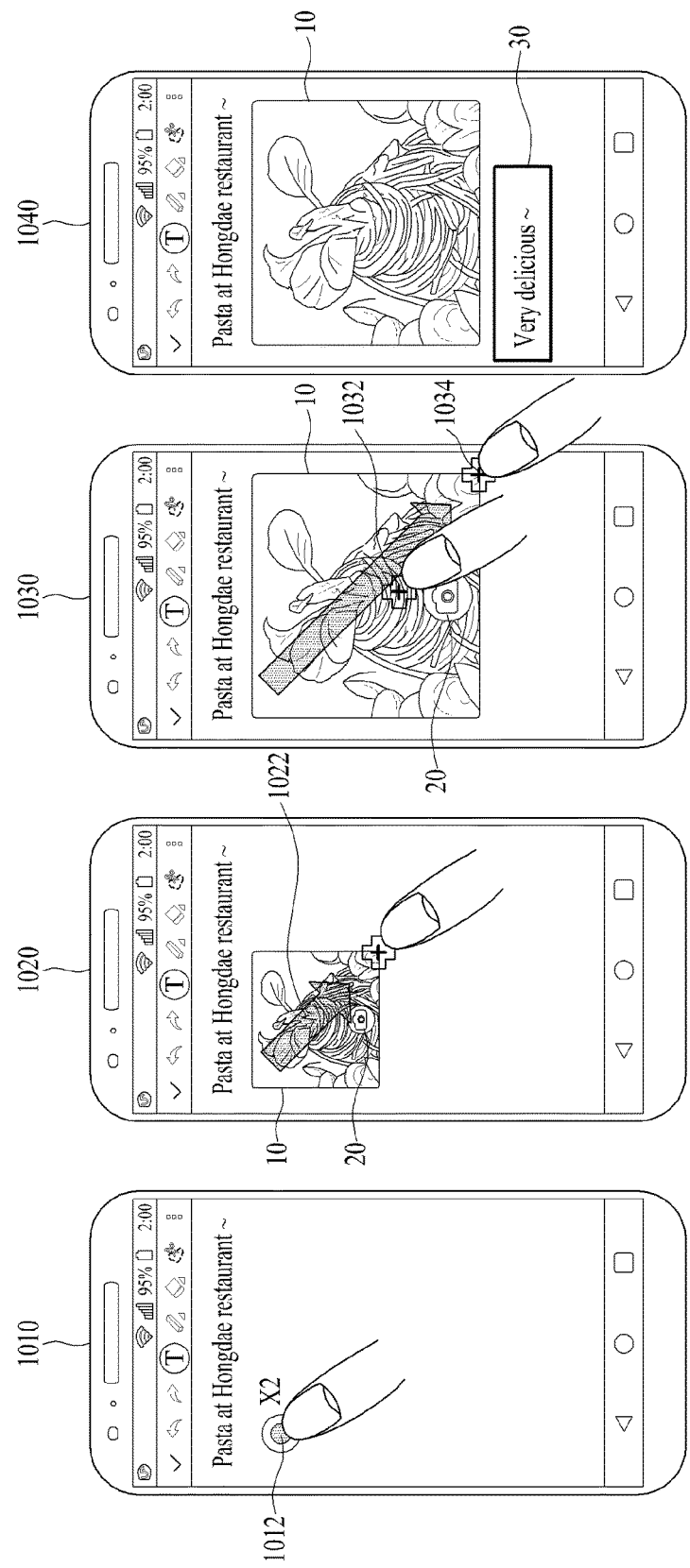
FIG. 10 is a diagram to describe one example of if a user touches a screen with a finger prescribed times and then drags the finger on the screen, activating a camera according to one embodiment of the present invention.

FIG. 10 is a diagram to describe one example of if a user touches a screen with a finger prescribed times and then drags the finger on the screen, activating a camera according to one embodiment of the present invention.

Referring to FIG. 10, if a touch input applied to a specific point of a screen prescribed times at least and a touch input of applying a drag in a specific direction are received from a user, the controller 180 displays a preview screen. While the preview screen is displayed, if an input of touching a $1^{st}$ point of the preview screen is received from the user and the touch input is moved to a $2^{nd}$ point by maintaining the touch state, the controller 180 displays the preview screen of which screen size is adjusted based on the $1^{st}$ point and the $2^{nd}$ point.

Referring to an embodiment 1010, a user applies a touch input to a specific point 1012 of a screen prescribed times at least. Subsequently, referring to an embodiment 1020, if a touch input of applying a drag in a specific direction 1022 is received from the user, the controller 180 displays a preview screen 10.

That is, in order to take a photo, if the user taps the specific point 1012 of the screen with a finger and then drags the screen in the specific direction 1022 like the embodiment

1020, the controller 180 adjusts a size of the preview screen 10 in response to user's pinch-out touch input while displaying the preview screen 10.

Referring to an embodiment 1030, while the preview screen 10 is displayed, an input of touching a $1^{st}$ point 1032 of the preview screen is received from the user.

Thereafter, while the touch state is maintained, if the touch input is moved to a $2^{nd}$ point 1034, the controller 180 displays the preview screen 10 of which screen size is adjusted based on the $1^{st}$ point 1032 and the $2^{nd}$ point 1034.

If an input of touching a shot button 20 is received from the user, the controller 180 creates a specific image by capturing an object displayed on the preview screen 10.

The user can adjust a size of the preview screen 10 into a specific size desired by the user in a manner of dragging a specific point of an outline of the preview screen 10.

Referring to an embodiment 1040, after photographing, if a specific input is received from the user, the controller 180 displays a message box 30 capable of inputting a text.

According to the present invention, after a user has photographed meals at a restaurant, the user can input impressions or reviews using a message box capable of inputting texts. Hence, user convenience can be enhanced.

Figure 11:
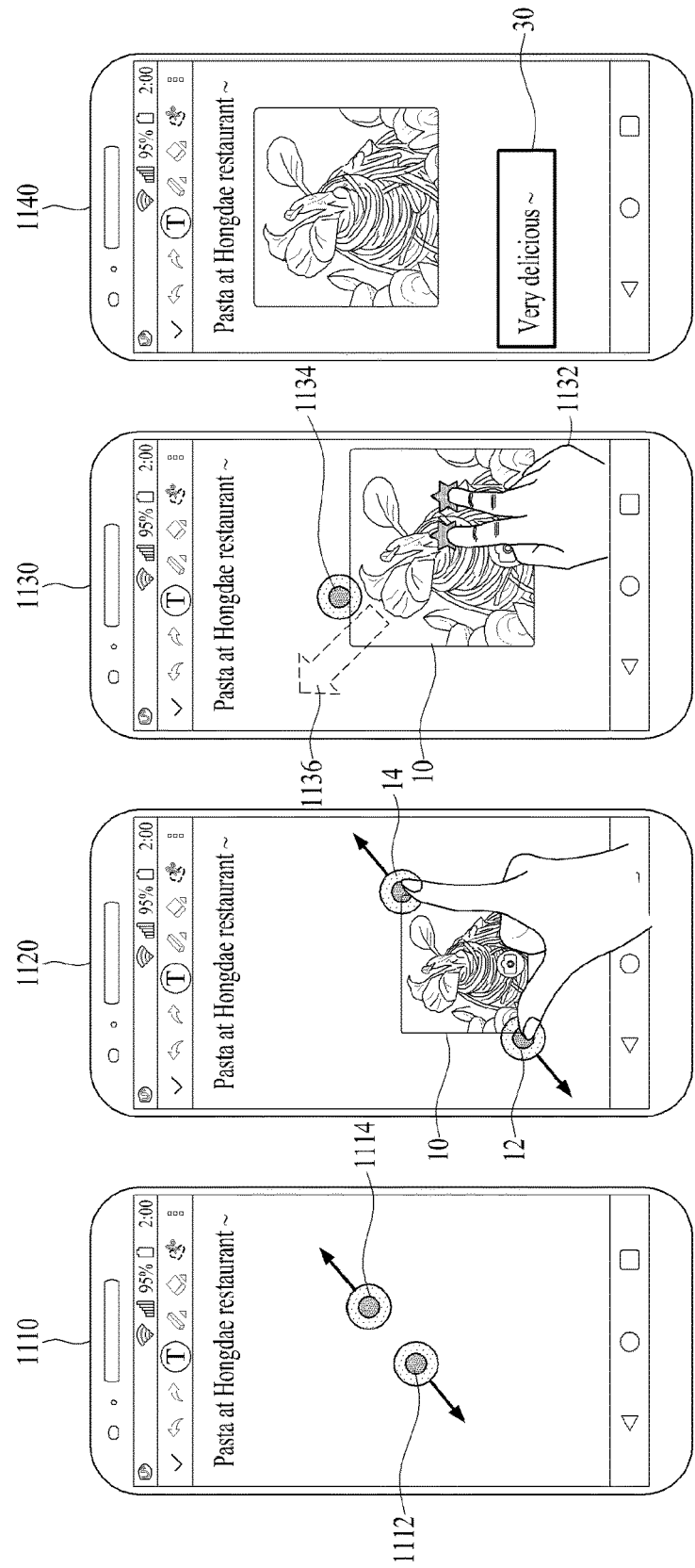
FIG. 11 is a diagram to describe one example of if a user pinches out on a screen, activating a camera according to one embodiment of the present invention.

FIG. 11 is a diagram to describe one example of if a user pinches out on a screen, activating a camera according to one embodiment of the present invention.

Referring to FIG. 11, if a specific touch input to a specific point of a screen is received from a user, the controller 180 displays a preview screen. While the preview screen is displayed, if a touch input of pinching out a $1^{st}$ point and a $2^{nd}$ point of the preview screen is received from the user, the controller 180 adjusts a size of the preview screen. If an input of touching a specific point of the preview screen is received from the user and the touch input is moved to a $4^{th}$ point from a $3^{rd}$ point corresponding to the specific point by maintaining the touch state, the controller 180 moves the preview screen to the $4^{th}$ point from the $3^{rd}$ point and then displays the moved preview screen.

Referring to an embodiment 1110, the controller 180 receives a specific touch input of touching a screen in a manner of pinching out a $1^{st}$ point 1112 and a $2^{nd}$ point 1114 of the screen from a user. If so, referring to an embodiment 1120, the controller 180 displays a preview screen 10.

Referring to the embodiment 1120, while the preview screen 10 is displayed, if a touch input of pinching out a $1^{st}$ point 12 and a $2^{nd}$ point 14 of the preview screen 10 is received from the user, the controller 180 enlarges a size of the preview screen 10.

On the other hand, while the preview screen 10 is displayed, if a touch input of pinching in a $1^{st}$ point 12 and a $2^{nd}$ point 14 of the preview screen 10 is received from the user, the controller 180 reduces a size of the preview screen 10.

Referring to an embodiment 1130, if an input of touching a specific point of the preview screen 10 is received from the user and the touch input is moved in a specific direction 1136 to a $4^{th}$ point 1134 from a $3^{rd}$ point 1132 corresponding to the specific point by maintaining the touch state, the controller 180 moves the preview screen 10 to the $4^{th}$ point 1134 from the $3^{rd}$ point 1132 and then displays the moved preview screen 10.

In this instance, the pinch-out action may have difficulty in designating an accurate position of the preview screen region 10. Therefore, the user can set the accurate position of the preview screen 10 in a manner of setting a size of the preview screen 10 by a pinch-out action and then moving the preview screen 10 with two fingers like the embodiment 1130.

Referring to an embodiment 1140, after photographing, if a specific input is received from the user, the controller 180 displays a message box 30 capable of inputting a text.

According to the present invention, after a user has photographed meals at a restaurant, the user can input impressions or reviews using a message box capable of inputting texts. Hence, user convenience can be enhanced.

Figure 12:
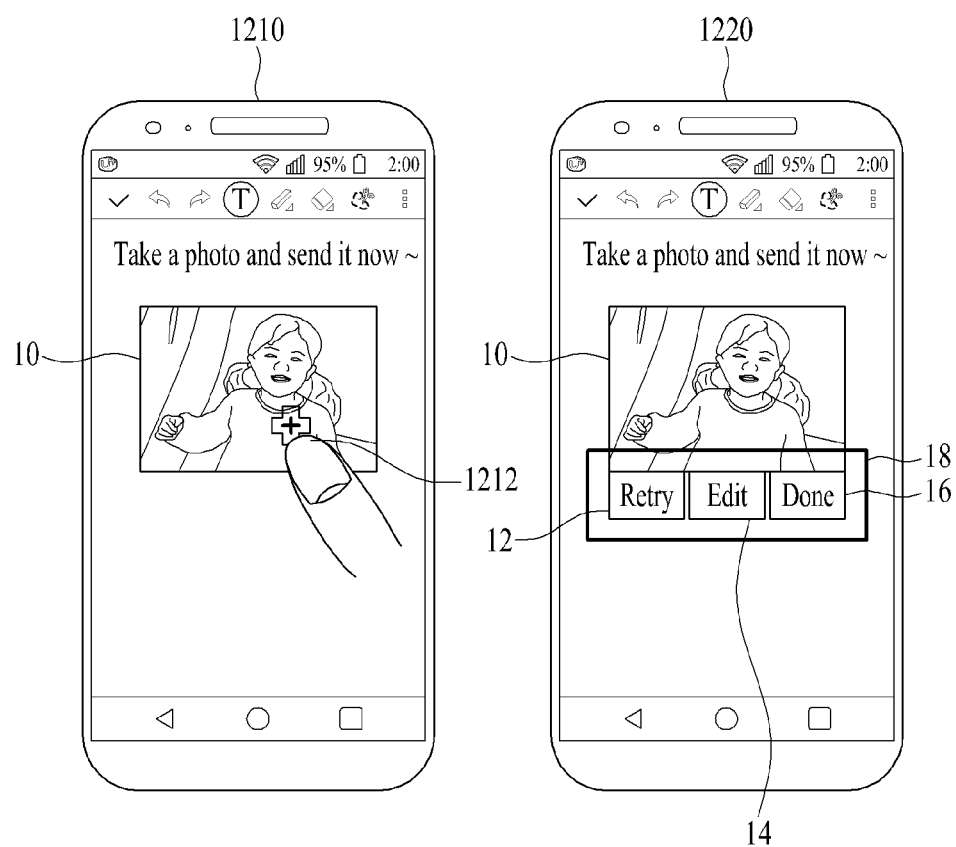
FIG. 12 is a diagram to describe one example of if a user touches a preview screen, activating a camera according to one embodiment of the present invention.

FIG. 12 is a diagram to describe one example of if a user touches a preview screen, activating a camera according to one embodiment of the present invention.

Referring to FIG. 12, while a camera application is run, if an input of touching a preview screen is received from a user, the controller 180 photographs a view in front of the mobile device and displays a message box including at least one of a retry button, an edit button and a done button after the photographing.

Referring to an embodiment 1210, while a camera application is run, if an input 1212 of touching a preview screen 10 is received from a user, the controller 180 photographs a view in front of the mobile device.

Referring to an embodiment 1220, after the photographing, the controller 180 displays a message box 18 including at least one of a retry button 12, an edit button 14 and a done button 16.

According to the present invention, if a user touches the preview screen 10, a photo is taken. After the photographing, the controller 180 displays a message box including at least one of the retry button 12, the edit button 14 and the done button 16. Hence, the user can take a photo using a simple touch action only and is able to directly retake or edit the photo, whereby user convenience can be enhanced.

Figure 13:
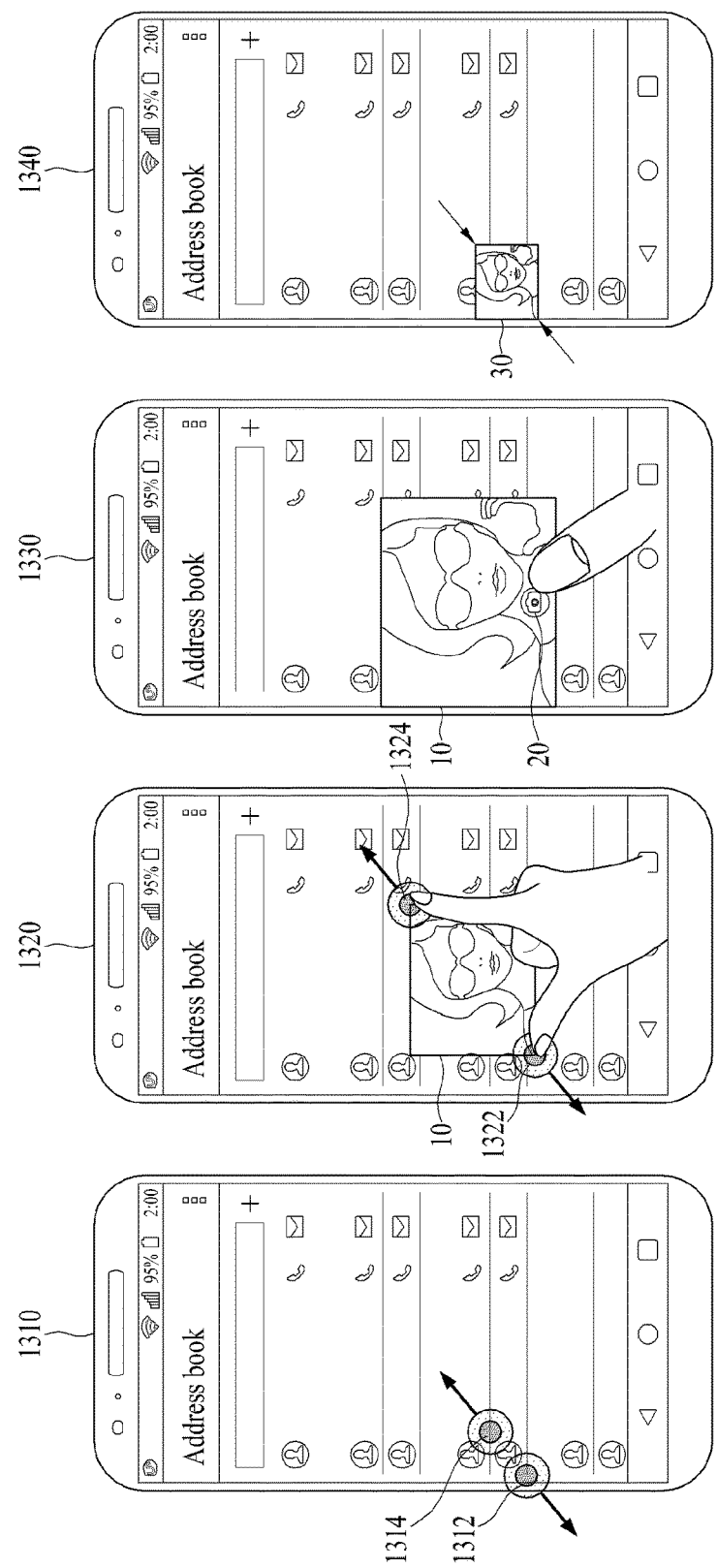
FIG. 13 is a diagram to describe one example of photographing a specific person using a camera and then inserting a photographed image in a region corresponding to a specific phone number according to one embodiment of the present invention.

FIG. 13 is a diagram to describe one example of photographing a specific person using a camera and then inserting a photographed image in a region corresponding to a specific phone number according to one embodiment of the present invention.

Referring to FIG. 13, while a phone number management application is run, if a specific touch input is received from a user, the controller 180 displays a preview screen, creates a specific image by photographing a view in front of the mobile device, and then changes the specific image into an icon corresponding to a specific phone number after the photographing.

Referring to an embodiment 1310, while a phone number management application is run, the controller 180 receives a specific touch input such as a pinch-out of a $1^{st}$ point 1312 and a $2^{nd}$ point 1314 of a screen from a user.

Referring to an embodiment 1320, in response to the received specific touch input, the controller 180 displays a preview screen 10.

If a pinch-out touch input to a $3^{rd}$ point 1322 and a $4^{th}$ point 1324 is received from the user, the controller 180 enlarges the preview screen 10.

On the other hand, if a pinch-in touch input to a $3^{rd}$ point 1322 and a $4^{th}$ point 1324 is received from the user, the controller 180 reduces the preview screen 10.

Referring to an embodiment 1330, if an input of touching a shot button 20 is received from the user, the controller 180 photographs a view in front of the mobile device 100 and then creates a specific image 10.

Referring to an embodiment 1340, after the photographing, the controller 180 reduces a size of the specific image 10 and then changes the reduced specific image 10 into an icon 30 corresponding to a specific phone number.

According to the present invention, while a phone number management application is executed, a specific image is created in a manner of activating a camera using user's simple pinch-out action and then photographing a person in front of a mobile device. Subsequently, the created specific image can be changed into an icon corresponding to a specific phone number. Hence, user convenience can be enhanced.

Figure 14:
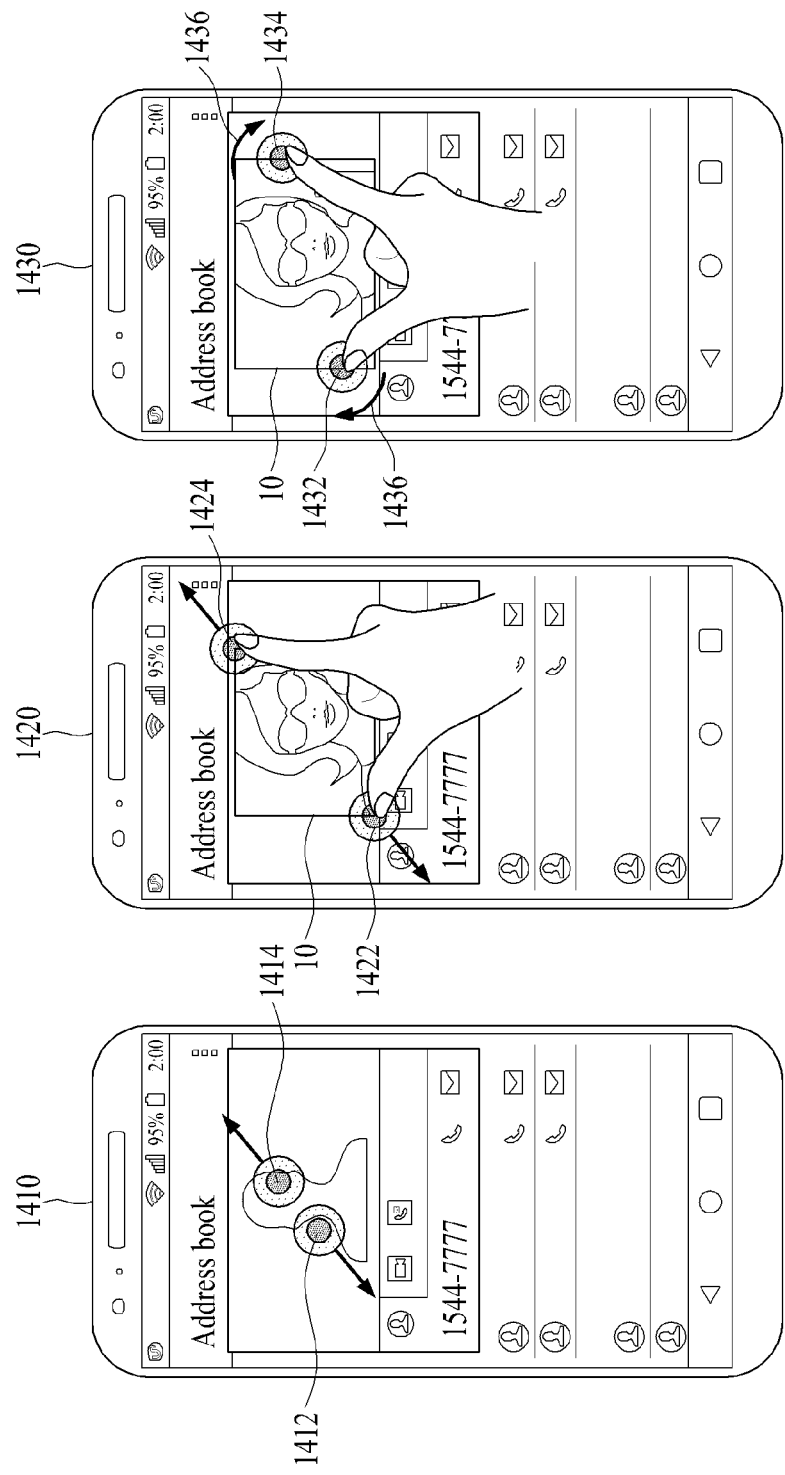
FIG. 14 is a diagram to describe one example of displaying a preview screen in response to user's pinch-out action and then adjusting a width-to-length ratio of the preview screen according to one embodiment of the present invention.

FIG. 14 is a diagram to describe one example of displaying a preview screen in response to user's pinch-out action and then adjusting a width-to-height ratio of the preview screen according to one embodiment of the present invention.

Referring to FIG. 14, while a phone number management application is executed, if a specific touch input is received from a user, the controller 180 displays the preview screen and adjusts a size of the preview screen in accordance with the specific touch input. If a 1$^{st}$ touch input of rotating in a 2$^{nd}$ direction and a 2$^{nd}$ touch input of rotating in the 2$^{nd}$ direction are received from the user, the controller 180 displays the preview screen by changing a length ratio of the preview screen.

If a 1$^{st}$ touch input of rotating in a 1$^{st}$ direction and a 2$^{nd}$ touch input of rotating in the 1$^{st}$ direction are received from the user, the controller 180 displays the preview screen by changing a width ratio of the preview screen.

Referring to an embodiment 1410, while a phone number management application is run, the controller 180 receives a specific touch input such as a pinch-out of a 1$^{st}$ point 1412 and a 2$^{nd}$ point 1414 of a screen from a user. If so, the controller 180 displays a preview screen 10 like an embodiment 1420.

Referring to the embodiment 1420, in response to the received specific touch input, the controller 180 displays the preview screen 10.

While the preview screen 10 is displayed, if a pinch-out touch input to a 3$^{rd}$ point 1422 and a 4$^{th}$ point 1424 is received from the user, the controller 180 enlarges the preview screen 10.

On the other hand, if a pinch-in touch input to a 3$^{rd}$ point 1422 and a 4$^{th}$ point 1424 is received from the user, the controller 180 reduces the preview screen 10.

Referring to an embodiment 1430, if a 1$^{st}$ touch input 1432 of rotating in a 2$^{nd}$ direction 1436 and a 2$^{nd}$ touch input 1434 of rotating in the 2$^{nd}$ direction 1436 are received from the user, the controller 180 displays the preview screen 10 by changing a length ratio of the preview screen. In this case, the 2$^{nd}$ direction 1436 may include one of a clockwise direction and a counterclockwise direction.

On the other hand, if a 1$^{st}$ touch input 1432 of rotating in a 1$^{st}$ direction and a 2$^{nd}$ touch input 1434 of rotating in the 1$^{st}$ direction are received from the user, the controller 180 displays the preview screen 10 by changing a width ratio of the preview screen.

In this instance, the 1$^{st}$ direction and the 2$^{nd}$ direction are opposite to each other. If the 1$^{st}$ direction is clockwise, the 2$^{nd}$ direction becomes counterclockwise. If the 1$^{st}$ direction is counterclockwise, the 2$^{nd}$ direction becomes clockwise.

According to the present invention, if a user touches a screen with a pinch-out action, a preview screen 10 is displayed. If a size of the preview screen is adjusted by a pinch-out action and the preview screen is rotated with two fingers, a width or length ratio of the preview screen can be adjusted. As a user can take a photo in a size of a preview screen using a simple touch action only and is able to directly retake and edit the photo after the photographing, user convenience can be enhanced.

According to one embodiment of the present invention, a camera application can be launched using a simple gesture only in the course of running a specific application, a size of a preview screen can be adjusted using user's simple action, and a photo can be inserted in an appropriate location, whereby user's convenience can be enhanced.

According to another embodiment of the present invention, a preview screen is displayed with reference to points touched with two fingers in case of long touching a screen with the two fingers in a state that the mobile device is stood up and a camera is activated, whereby user's convenience can be enhanced.

According to further embodiment of the present invention, a preview screen region is initially set through a long touch input and a size and width-to-length ratio of the preview screen can be adjusted using user's simple touch input only, whereby user's convenience can be enhanced.

According to another further embodiment of the present invention, a preview screen is displayed in case of receiving an input of touching a screen prescribed times and a drag touch input from a user and a size of the preview screen can be adjusted through user's simple touch input only, whereby user's convenience can be enhanced.

It will be appreciated by those skilled in the art that various modifications and variations can be made in the present invention without departing from the spirit or scope of the inventions. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile device comprising:
an input unit configured to receive a user input;
a camera;
a touchscreen; and
a controller, operatively coupled to the camera and the touchscreen, configured to:
control the touchscreen to display a selection screen enabling a user to select either a gallery application or a camera application in response to the user input,
execute the gallery application or the camera application based on a selection by the user, and
control the touchscreen to:
display a preview screen associated with the application being executed,
adjust at least one of a size and position of the preview screen associated with the application in response to a touch input from the user,
enlarge the preview screen at a constant rate while maintaining a first touch input received from the user when a second touch input is received from the user, wherein only the second touch input between the first touch input and the second touch input has an applied pressure equal to or greater than a reference value, and
control the touchscreen to reduce the size of the preview screen at a constant rate while maintaining a second touch input received from the user when a first touch input is received from the user, wherein only the first touch input between the first touch input and the second touch input has an applied pressure equal to or greater than the reference value, and wherein first touch input point is different from second touch input point.

2. The mobile device of claim 1, wherein the controller is further configured to control the touchscreen to:
   display a screen for selecting the capture application for capturing a screen image,
   display a first capture button in response to the user selecting the capture application,
   display a screen image by capturing a current screen in response to the user selecting the first capture button,
   display a preview screen of the created screen image, and
   adjust at least one of a size and a position of the preview screen of the created screen image in response to a touch input from the user.

3. The mobile device of claim 1, wherein the controller is further configured to control the touchscreen to change a width-to-length ratio of the preview screen when a third touch input is received from the user and when the user makes a rotation gesture in a first direction using a fourth touch input.

4. The mobile device of claim 1, wherein the controller is further configured to control the touchscreen to change a height-to-length ratio of the preview screen when a third touch input is received from the user and the user makes a rotational gesture in a first direction using a fourth touch input.

5. The mobile device of claim 1, wherein the controller is further configured to control the touchscreen to:
   display the preview screen when a third touch input and a fourth touch input different from the third touch input are received from the user within a prescribed time period, and
   adjust the size of the preview screen when the third touch input is moved to a first point while maintaining its touch state and the fourth touch input is moved to a second point while maintaining its touch state,
   wherein the size of the preview screen is adjusted based on the location of the first point and the location of the second point relative to each other.

6. The mobile device of claim 1, wherein the controller is further configured to control the touchscreen to:
   display the preview screen when a third touch input is applied at a specific point within a prescribed time period and a fourth touch input that involves a dragging movement in a specific direction is received from the user, and
   adjust the size of the preview screen when a fifth touch input is moved from a first point to a second point while maintaining the touch state,
   wherein the size of the preview screen is adjusted based on the location of the first point and the location of the second point relative to each other.

7. The mobile device of claim 1, wherein the controller is further configured to control the touchscreen to:
   display the preview screen when a third touch input at a specific point is received from the user,
   adjust the size of the preview screen when the user makes a pinch-out gesture with a fourth touch input using a first point and a second point on the preview screen,
   move the preview screen from a first position to a second position when:
      the user touches a predetermined region of the preview screen, and
      the user drags the preview screen from the first position to the second position, and
      display the moved preview screen.

8. The mobile device of claim 1, wherein the controller is further configured to control the camera to take a picture when the camera application is selected and executed, and when a touch input on the preview screen is received from the user, and
   wherein the controller is further configured to control the touchscreen to display a message box including at least one of a retry button, an edit button and a done button after taking the picture.

9. The mobile device of claim 1, wherein the controller is further configured to control the touchscreen to:
   display the preview screen while a phone number management application is executed,
   create an image by taking a picture, and
   change the image into an icon corresponding to a phone number after taking the picture.

10. The mobile device of claim 1, wherein the controller is further configured to control the touchscreen to:
    display the preview screen while a phone number management application is executed when a specific touch input is received from the user, and
    adjust a height-to-length ratio of the preview screen when the user makes a rotational gesture in a first direction using third and fourth touch inputs.

11. The mobile device of claim 10, wherein the controller is further configured to control the touchscreen to adjust a width-to-length ratio of the preview screen when the user makes a rotational gesture in a second direction using third and fourth touch inputs.

12. A method of controlling a mobile device executing an application, the method comprising the steps of:
    displaying a selection screen that enables a user to select either a gallery application or a camera application;
    executing the gallery application or the camera application based on a user selection;
    displaying a preview screen associated with the selected application;
    adjusting at least one of a size and position of the preview screen in response to a touch input from the user;
    controlling a touchscreen to enlarge the preview screen at a constant rate while maintaining a first touch input received from the user when a second touch input having an applied pressure equal to or greater than a reference value is received from the user, wherein only the second touch input between the first touch input and the second touch input has an applied pressure equal to or greater than a reference value; and
    controlling the touchscreen to reduce the size of the preview screen at a constant rate while maintaining a second touch input received from the user when a first touch input is received from the user, wherein only the first touch input between the first touch input and the second touch input has an applied pressure equal to or greater than the reference value, and
    wherein first touch input point is different from second touch input point.

* * * * *